Nov. 28, 1939.  D. B. D. BLAKE  2,181,415
VALVE MECHANISM FOR SHOCK ABSORBERS
Filed Dec. 14, 1935  3 Sheets-Sheet 2
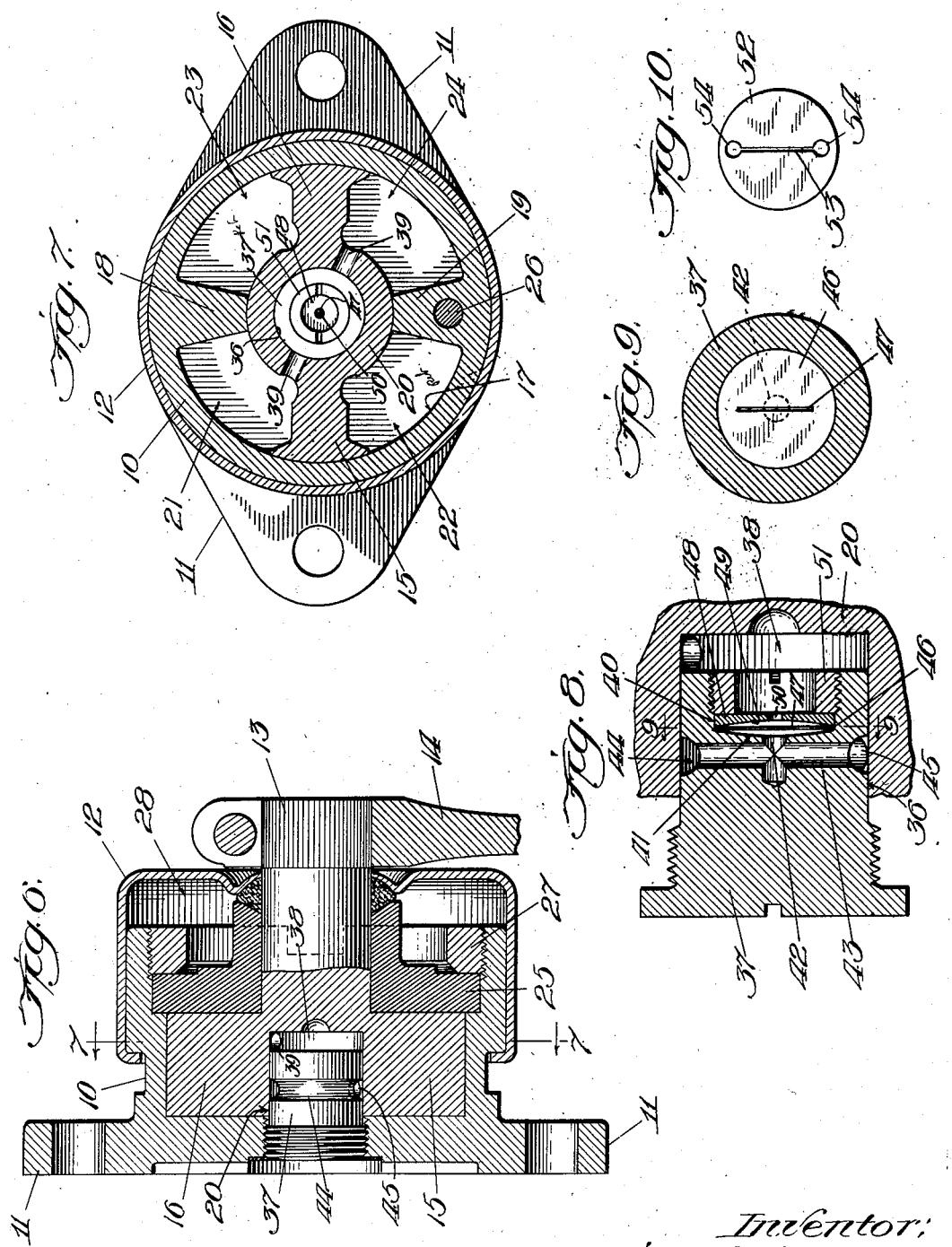
Inventor:
Dennis B. D. Blake
By Davis, Macauley, Mary, Lindsey & Smith
Attys.

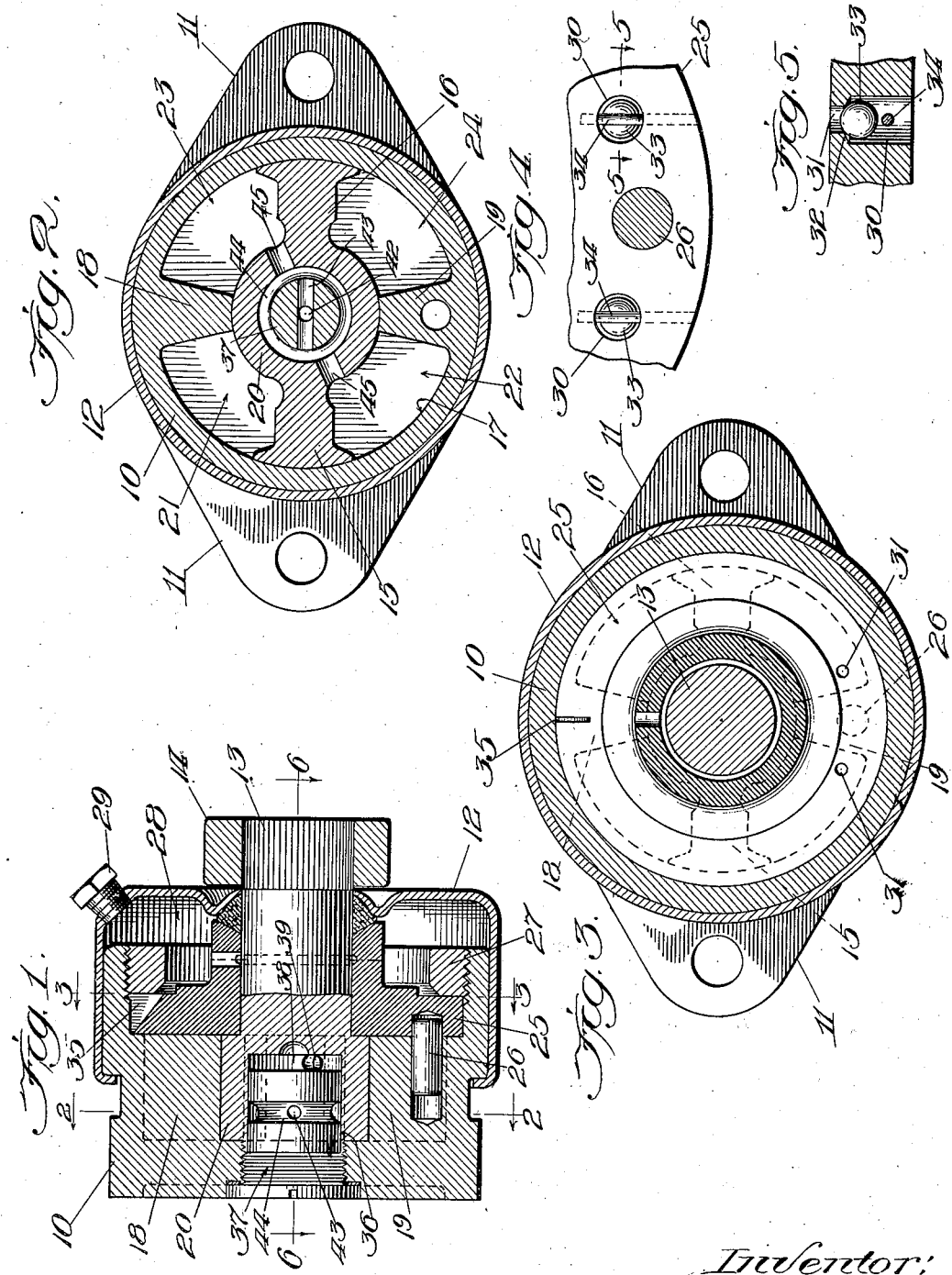

Nov. 28, 1939.  D. B. D. BLAKE  2,181,415
VALVE MECHANISM FOR SHOCK ABSORBERS
Filed Dec. 14, 1935  3 Sheets-Sheet 3
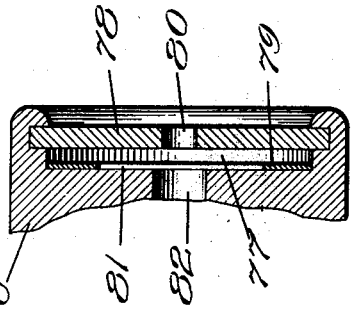
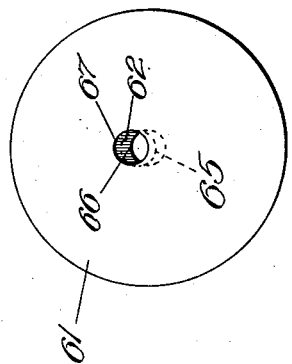
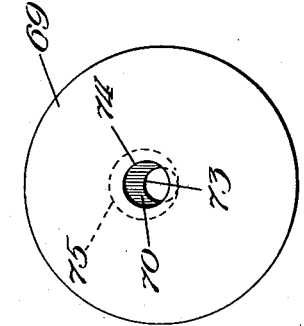
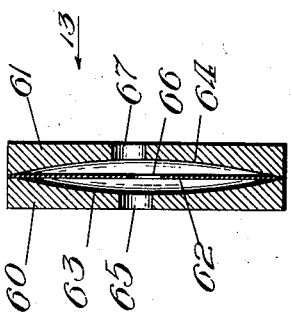
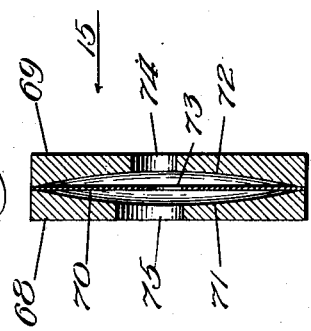
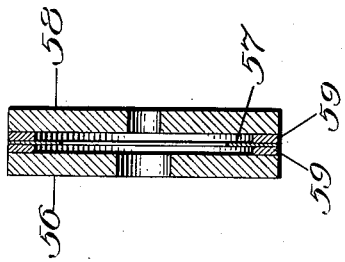
Inventor:
Dennis B. D. Blake
Davis, Macauley, May, Lindsey & Smith
Attys.

Patented Nov. 28, 1939

2,181,415

UNITED STATES PATENT OFFICE 2,181,415

VALVE MECHANISM FOR SHOCK ABSORBERS

Dennis B. D. Blake, Chicago, Ill., assignor of one-half to Donald E. Willard, Danville, Ill.

Application December 14, 1935, Serial No. 54,391

8 Claims. (Cl. 138—46)

My invention relates to valve mechanism for vehicular shock absorbers of the hydraulic type for controlling the yielding and/or rebound movements of the load-sustaining springs by the interposition of a braking resistance created by the flow of a liquid through restricted orifices or openings in general.

One object of my invention is to devise a shock absorber in which the flow of the working fluid is controlled by the cooperative action of a plurality of valve elements having orifices which are partially masked by the relative movements of the valve members to form a flow controlling aperture having an area differing from either of the orifices.

A further object is to provide a shock absorber in which the valving of the liquid to control its flow in opposite directions in response to up and down movements of the vehicle wheels is accomplished by the movement of a single valve member which may be calibrated to effect a greater resistance to the rebound than to the yielding movement of the vehicle springs, or to provide any desired relation between the movements of the fluid in opposite directions.

A further object is to provide a shock absorber valve structure which may be readily modified to meet a variety of operating conditions, and is further characterized by a simplicity in design which is reflected in low manufacturing and maintenance cost.

These and further objects of my invention will be set forth in the following specification, reference being had to the accompanying drawings, and the novel means by which said objects are effectuated will be definitely pointed out in the claims.

In the drawings:

Figure 1 is a vertical sectional elevation of a typical rotary shock absorber, showing one application of my improved valve structure thereto.

Fig. 2 is a section along the line 2—2 in Fig. 1, looking in the direction of the arrows, and showing the working chambers of the shock absorber.

Fig. 3 is a section along the line 3—3 in Fig. 1, looking in the direction of the arrows.

Fig. 4 is a partial, elevational view, showing the opposite side of the retaining plate which maintains the piston member of the shock absorber in position and illustrating the usual automatically actuated check valves for maintaining a working supply of fluid in the chambers of the unit.

Fig. 5 is a sectional view along the line 5—5 in Fig. 4, showing the check valves in question.

Fig. 6 is a section along the line 6—6 in Fig. 1, looking in the direction of the arrows.

Fig. 7 is a section along the line 7—7 in Fig. 6, looking in the direction of the arrows, and illustrating the passages for communicating the yield chambers of the shock absorber with the valve structure hereinafter described.

Fig. 8 is an enlarged sectional view of my improved valve structure as it appears in Fig. 6.

Fig. 9 is a section along the line 9—9 in Fig. 8, looking in the direction of the arrows and showing the slot-shaped aperture in the flexible member of the valve structure.

Fig. 10 is a view corresponding to Fig. 9, but showing a modified type of slot.

Fig. 11 is a sectional elevation of a further modification of the valve structure, corresponding to that illustrated in Fig. 8.

Fig. 12 is a sectional elevation of a still further modification, showing the use of a circular orifice in each of the cooperating valve members.

Fig. 13 is an end view of the valve structure shown in Fig. 12, looking in the direction of the arrow 13 in said figure.

Fig. 14 is a sectional elevation of a still further modification of the valve structure in which the cooperating valve elements are provided with circular apertures having different diameters.

Fig. 15 is an end view of the structure shown in Fig. 14, looking in the direction of the arrow 15 in said figure.

Fig. 16 is a sectional elevation of a further modification in which one of the members is shifted bodily instead of being flexed.

For purpose of illustration, my improved valve structure has been illustrated and will be described in connection with a rotary type of shock absorber. However, since my invention more particularly resides in the construction of the valving elements, it will be understood that my improved valve structure is capable of application to other types of shock absorbers, such as those characterized by a reciprocating action, and generally to all shock absorbers in which it is desired to suitably control the movement of a working fluid between chambers of the shock absorber unit.

Referring then to Figs. 1 to 5, inclusive, the numeral 10 designates a brake chamber casing of a rotary type of shock absorber which may be provided with a pair of laterally extending ears 11 by means of which the casing is customarily bolted to the principal frame member of a vehicle chassis, and which is further provided with the usual cover 12. A stub shaft 13 extends through the cover and on its outer end has secured thereto a rock arm 14, the opposite end of the arm being appropriately fashioned for attachment to any desired type of linkage or other connecting feature for actuating the lever in response to movements of a vehicle axle, or generally to the up and down movements of a vehicle wheel on a vehicle provided with independent suspension.

The inner end of the shaft 13 has fastened thereto or integrally formed therewith laterally and oppositely extending piston wings 15 and 16 and the outer surfaces of these wings are curved to snugly fit the inner wall 17 of the casing. Abutments 18 and 19, located in opposite relation to each other and on opposite sides of the shaft 13, project inwardly from the wall of the casing and their inner surfaces are curved to snugly fit a hub 20 formed on the inner end of the shaft 13 and from which the wings 15 and 16 extend.

The wing 15 forms with the abutments 18 and 19 brake chambers 21 and 22, respectively, which will be regarded as yield and rebound chambers, respectively, while the wing 16 forms with the same abutments brake chambers 23 and 24, respectively, which will be regarded as rebound and yield chambers, respectively.

Endwise movement of the stub shaft 13 toward the left, as viewed in Fig. 1, is prevented by the base of the casing 10, while movement in the opposite direction is prevented by a retaining plate 25 whose rotary movement is prevented by a pin 26 having its opposite ends seated in the abutment 19 and in the plate, as clearly indicated in Fig. 1, the plate being held in position by a retaining ring 27 that is threaded in the open end of the casing 10.

The cap 12 forms with the retaining plate 25 and casing 10 a reservoir 28 that may be filled from time to time by removing a plug 29 that is threaded in the cover 12. Communication between the reservoir 28 and the brake chambers of the shock absorber is provided by a pair of ducts 30, each of which is in axial alignment with a duct 31 having a smaller diameter, the junction of the respective ducts defining a valve seat 32 which is adapted to be closed by a ball check 33. Movement of the ball check away from the seat is limited by a pin 34. Air relief within the brake chambers is provided by a vent groove 35 which is cut through the upper side of the retaining plate 25, as clearly shown in Fig. 1. In the operation of the shock absorber, the air, which always accumulates at the highest point of the brake chambers, escapes through the groove 35 into the reservoir 28, reentry of the air being prevented by the liquid which seals these parts.

The foregoing shock absorber structure is more or less typical of absorbing units characterized by a rotary action and in and of itself forms no part of the present invention which more particularly relates to the valve structure for controlling the flow of liquid between the brake chambers of the unit.

Referring more particularly to Fig. 8, the shaft hub 20 is bored inwardly as at 36 from the left end thereof, as viewed in Fig. 1, to snugly receive a plug 37 that is threaded in the casing 10. The right end of the plug 37 terminates short of the base of the bore 36 to define a space 38 that communicates with the brake chambers 21 and 24 by radial passages 39 provided in the hub 20.

The inner or right end of the plug 37, as viewed in Fig. 8, is bored as at 40 and the base of this bore is preferably shaped with a concave surface 41 for a purpose presently explained. A short, axially disposed passage 42 communicates the bore 40 with a diametrical passage 43 provided in the plug 37, the outer extremities of the passage 43 terminating in an annular groove 44, also provided in the plug. The groove 44 is in communication with a pair of radially disposed passages 45, also provided in the hub 20, and whose outer extremities are in communication with the rebound, brake chambers 22 and 23.

A thin, flexible plate member 46 is seated against the base of the bore 40 with its periphery closely fitting the circular wall thereof and this member is further provided with a slot-shaped aperture 47 (see Fig. 9). Also snugly fitting in the bore 40 is a plate member 48 that is provided with a concave face 49 which is located in facing relation to one side of the member 46. The valve member 48 is further provided with a short passage defining a circular orifice or aperture 50 that is preferably smaller in diameter than the orifice 42, for a purpose presently explained. Moreover, the diameter of each orifice is less than the length of the slot aperture 47, but greater than the width thereof. The valve elements 46 and 48 are held in the position indicated in Fig. 8, namely, in contact with each other and with the member 46 resting against the base of the bore 40 by a retaining ring 51 which is threaded in the bore 40.

In discussing the operation of my improved shock absorber, it will be assumed that the reservoir 28 and the brake chambers are filled with an adequate supply of fluid. As long as the vehicle is at rest or moving along a substantially level roadway, the arms 14 and accordingly the piston wings 15 and 16 will occupy the more or less symmetrical positions shown in Figs. 2, 6 and 7, but when a wheel of the vehicle rides over a raised portion of the roadway, for example, the accompanying movement of the axle or other part of the vehicle to which the outer end of the arm 14 is connected, in conjunction with the weight of and load on the vehicle, will cause a yielding movement of the springs and a consequent actuation of the arm 14 in a clockwise direction, thus moving the piston wings in the same direction. This movement of the piston wings creates a definite pressure on the fluid within the yield brake chambers 21 and 24, dependent upon the speed of the movement. The fluid is accordingly driven through the passages 39 into the chamber 38 and then through the orifice 50. Fluid issuing from the orifice 50 flexes the member 46 into substantial seating relation with the concave face 41 and thereby creates a temporary, flow-controlling orifice, as determined by that portion of the slot 47 which is in communication with the orifice 42. In other words, this temporary aperture will be defined by an opening having a length equal to the diameter of the orifice 42 and a width equal to the width of the slot 47. In the design of the valve structure, and considering the direction of flow of the fluid just described, it will be understood that the area of this temporary aperture is less than the area of the orifice 50 and also of the orifice 42, so that the flow of the fluid is definitely controlled by this temporary aperture.

Fluid issuing from the orifice 42 then passes through the passage 43 into the annular groove 44 and then through the radial passages 45 into the rebound brake chambers 22 and 23.

Upon the completion of the yielding movement of the springs, the rebound movement, which in the present instance is considered to be more violent than the original displacement must therefore be restrained to a greater extent than that necessary during the yielding movement. Under these conditions, the piston wings 15 and 16 are rotated in a counterclockwise direction, as viewed in Figs. 2 and 7, by the spring force acting against the arm 14, so that fluid is forced from the rebound chambers 22 and 23 and eventually reaches the orifice 42 by way of the passages 45, annular groove 44 and passage 43. The fluid which passes through the orifice 42 then flexes the member 46 toward the right, as viewed in Fig. 8, until it substantially seats against the concave face 49, thereby creating a temporary aperture as determined by the diameter of the orifice 50. Since the diameter of the latter orifice is less than that of the orifice 42, the temporary elongated aperture created in the member 46 will thus have an area less than that of the temporary aperture formed by seating of the member 46 against the concave face 41, so that a greater restriction is interposed to the rebound movement of the spring. The liquid which issues from the orifice 50 during the aforesaid movement finally reaches the yield brake chambers 21 and 24 by means of the chamber 38 and radial passages 39.

It will be understood that the seating of the member 46 against the concave faces 41 and 49 occurs only when the pressure of the liquid is sufficient to accomplish this result. For limited movements of the rock arm 14, or under road conditions where the transfer of liquid between the brake chambers is accomplished at a relatively slow speed, it is contemplated that the member 46 may only be flexed slightly from the intermediate position shown in Fig. 8, so that liquid may flow through the entire length of the slot 47. Under these conditions, restrictive control of the fluid would depend upon whether the area of the orifice 50 was greater than that of the slot 47 or vice versa.

It is contemplated that the member 46 will be made of spring steel having sufficient thinness to flex readily in either direction and, to this end, the thickness of the member may be of the order of .008 inch to .009 inch. One valve structure which has been found to operate successfully is provided with a member 46 having the indicated thickness, and a length and width of slot about 1/16 of an inch and .010", respectively. The orifice 50 may possess a diameter of the order of 1/16 of an inch, while that of the orifice 42 may be about 3/32 of an inch. The lengths of the orifices 42 and 50 may be about 1/16 of an inch and the extent of concavity of the faces 41 and 49 may be of the order of 1/64 of an inch. The foregoing figures are by way of example only and indicate one typical operative structure. The dimensions, however, may be varied as desired, dependent upon the conditions of operation and the extent of restriction required.

In Fig. 10 is illustrated a suggested modified arrangement of the flexible valve element 46, as designated by the numeral 52. The latter element includes a slot 53, similar to the slot 47, but the ends of the former slot are enlarged as at 54, so that the complete opening is in the shape of a dumb-bell. A slot of this character possesses certain advantages in respect of rendering the element 52 more flexible, as well as reducing the likelihood of the element splitting or cracking.

In Fig. 11 is illustrated a still further modification of the valve structure and which is shown as being composed of three separate plate members 56, 57 and 58 which are comparable to and are apertured similarly to the valve element of which the orifice 42 is a part, the element 46 and the element 48, respectively. In the present instance, however, the end elements 56 and 58, instead of having their opposed faces concave, are formed as flat surfaces and the flexible element 57 is spaced therefrom by annular rings 59. The flexing action of the intermediate member 57 is identical with that of the member 46, except that the former cannot be deflected into full contact with the adjacent faces of the members 56 and 58, although it will be understood that the extent of the flexing is sufficient to insure the required masking of portions of the slot-shaped aperture in the member 57.

Referring to Figs. 12 and 13, there is illustrated another modification of my improved valve structure which is composed of end elements 60 and 61 with an intermediate, flexible element 62 interposed therebetween. As in the case of the valve structure illustrated in Fig. 8, the opposed faces of the members 60 and 61 are concave as at 63 and 64, respectively, and the members 60, 62 and 61 are provided with circular apertures 65, 66 and 67, respectively, which have the same diameter. However, the axes of these respective apertures are out of alignment, as clearly indicated in Fig. 12, the suggested arrangement placing the axis of the aperture 66 in coincidence with the axis of the intermediate member 62 and with the axes of the apertures 65 and 67 displaced therefrom and relative to each other. Accordingly, when the member 62 is flexed toward the right, as viewed in Fig. 12, the area of the temporary aperture thereby formed will be less than when the member 62 is flexed toward the left, thereby providing for a greater restrictive control on the movement of the fluid in one direction than in the other.

Referring to Figs. 14 and 15, there is illustrated a still further modification which comprises end valve members 68 and 69 with an intermediate, flexible member 70 interposed therebetween after the general manner indicated in Fig. 8. The opposing faces of the members 68 and 69 are concave as at 71 and 72, respectively, and each of the members is provided with a circular aperture. For example, the intermediate member may be provided with a circular aperture 73 whose axis coincides with the axis of the member, while the member 69 may be provided with a larger orifice 74 whose axis is somewhat displaced from that of the orifice 73. Finally, the member 68 may also be provided with a still larger circular aperture 75 whose axis is not in alignment with the axes of either of the apertures 73 and 74. Accordingly, when the member 70 is flexed toward the right as viewed in Fig. 14, the temporary aperture thereby formed will have an area less than that created when the member 70 is flexed in the opposite direction, thus providing for the required control in both directions.

Referring to Fig. 16, there is illustrated a further modified type of valve structure which is fundamentally distinguished from those heretofore described in that a bodily shiftable valve element is utilized in place of a flexible valve element. Accordingly, the numeral 76 designates one of the end valve elements which may have one side thereof counterbored to provide a chamber 77 and the counterbored opening is closed by a valve element 78. Freely shiftable in an axial direction in the chamber 77 is a valve element 79, the limits of movement of this element being determined in one direction by the valve element 78 and in the opposite direction by the base of the chamber 77, or, in other words, the valve element 76. In the arrangement shown, the valve elements 78, 79 and 76 are provided with apertures 80, 81 and 82 whose shapes and sizes correspond to the apertures 50, 47 and 42, all respectively.

The operation of the foregoing valve structure is obvious from the drawings and it consists essentially in the creation of temporary flow controlling orifices by the masking action created by the movement bodily in an axial direction of the valve member 79. By providing for this type of movement, it is possible to employ a somewhat thicker sheet of metal for the valve element 79, which may increase its serviceable life. The structure shown in Fig. 16 is capable of many variations without departing from the essential construction in that, for example, the general principle involved contemplates a holding of the valve elements 76 and 78 against any movement in an axial direction and it is not necessary that one of these elements be held against movement by the other, as indicated by the drawings. As in the case of the foregoing valve devices, it is possible to obtain a throttling action by utilizing the valve element 79 with either one of the other valve elements, dependent upon the conditions of operation and the amount of restriction required. The principal feature of this modification is also capable of adaptation to the variations shown in Figs. 12 and 14, for example, as regards the use of circular apertures and their disalignment in an axial direction.

From the foregoing, it will be obvious that my improved valve structure is characterized by a ready adaptation to meet a wide variety of service conditions. The diameters and shapes and axial relations of the apertures or orifices in the several valve elements of which the structure is composed may be changed as desired, the structure may be composed of three separate elements arranged in any of the relations above described, or the structure may be simply composed of two elements, namely, one of the end elements and the flexible or bodily shiftable element. Whichever of the modifications is adopted, or an equivalent structure thereto, it is apparent that the arrangement is characterized by simplicity of construction and comparative freedom from moving parts, since the control of the fluid is achieved simply by the masking principle to which reference has hereinbefore been made.

I claim:

1. In a fluid flow shock absorber, a valve structure comprising a fixed plate member having a circular aperture and a thin, flexible plate member held against movement at its periphery and including an elongated aperture having a length and width longer and narrower, respectively, than the diameter of the circular aperture, the thin member being flexed into contact with the fixed member in response to fluid pressure on one side of the structure to mask a portion of each aperture sufficiently to form a resultant flow controlling opening having an area less than either of the apertures, and the thin member being flexed in the opposite direction in response to fluid pressure on the opposite side of the structure to unmask both apertures.

2. In a fluid flow shock absorber, a valve structure comprising a pair of fixed end members and a movable member disposed therebetween, each member having an aperture, the movable member being positioned relative to one end member in response to fluid pressure on one side of the structure to mask a portion of their respective apertures and the movable member being positioned relative to the other end member in response to fluid pressure on the opposite side of the structure to mask a portion of their respective apertures, said maskings forming resultant flow-controlling openings having different areas.

3. In a fluid flow shock absorber, a valve structure comprising a pair of fixed, end plate members and a thin, flexible plate member disposed therebetween and held against movement at its periphery, each member having an aperture, the thin member being flexed into contact with one end member in response to fluid pressure on one side of the structure to mask a portion of their respective apertures and flexed into contact with the other end member in response to fluid pressure on the opposite side of the structure to mask a portion of their respective apertures, said maskings forming resultant flow controlling openings having different areas.

4. In a fluid flow shock absorber, a valve structure comprising a pair of fixed, end plate members each having a circular aperture and the diameter of one aperture being different from the other and a thin, flexible plate member disposed between the end members and held against movement at its periphery, the thin member including an elongated aperture having a length and width longer and narrower, respectively, than the diameters of the circular apertures, the thin member being flexed into contact with one end member in response to fluid pressure on one side of the structure to mask a portion of their respective apertures and flexed into contact with the other end member in response to fluid pressure on the opposite side of the structure to mask a portion of their respective apertures, said maskings forming resultant flow controlling openings having different areas.

5. In a fluid flow shock absorber, a valve structure comprising a pair of end plate members and an intermediate plate member disposed therebetween, each member having a circular aperture and the diameter of each aperture being different from the remaining apertures, the axes of the apertures being out of alignment, and one end and the intermediate member being relatively positioned in response to fluid pressure on one side of the structure to contact and mask a portion of their respective apertures and the other end member and the intermediate member being relatively positioned in response to fluid pressure on the opposite side of the structure to contact and mask a portion of their respective apertures, the disalignment of the apertures being such that the areas of the resultant flow controlling openings formed by said maskings are characterized by different areas.

6. In a fluid flow shock absorber, a valve structure comprising a fixed plate member having a circular aperture and a thin, flexible plate member held against movement at its periphery and including an elongated aperture having a length and width longer and narrower, respectively, than the diameter of the circular aperture, the thin member being flexed into contact with the fixed member in response to fluid pressure on one side of the structure to mask a portion of each aperture sufficiently to form a resultant flow controlling opening having an area less than either of the apertures, and the thin member being flexed in the opposite direction in response to fluid pressure on the opposite side of the structure to unmask both apertures, the ends of the elongated aperture being enlarged to facilitate flexing of the thin member.

7. In a fluid flow shock absorber, a valve structure comprising a pair of end plate members and an intermediate plate member disposed therebetween, each member having an aperture whose area is different from the other apertures, one end member and the intermediate member being positioned in response to fluid pressure on one side of the structure to contact each other and mask a portion of their respective apertures and the other end member and the intermediate member being positioned in response to fluid pressure on the opposite side of the structure to contact each other and mask a portion of their respective apertures, said maskings forming resultant flow controlling openings having different areas.

8. In a fluid flow shock absorber, a valve structure comprising a pair of end members held against relative movement and an intermediate member disposed therebetween and adapted to be shifted bodily between the end members, the end members each having a circular aperture whose area is different from the aperture in the other end member and the intermediate member having an elongated aperture, one end member and the intermediate member being relatively positioned in response to fluid pressure on one side of the structure to mutually mask portions of their respective apertures and the other end member and the intermediate member being relatively positioned in response to fluid pressure on the opposite side of the structure to mutually mask portions of their respective apertures, said maskings forming resultant flow controlling openings having different areas.

DENNIS B. D. BLAKE.